CELL IDENTIFICATION AND SELECTION SYSTEM FOR CENTRIFUGE APPARATUS

Original Filed April 12, 1966 8 Sheets-Sheet 1

INVENTOR.
Robert C. Franklin
BY William R. Boyd
[signature]
Attorneys

INVENTOR.
Robert C. Franklin
BY William R. Boyd

Attorneys

June 30, 1970 R. C. FRANKLIN ET AL 3,518,012
CELL IDENTIFICATION AND SELECTION SYSTEM FOR
CENTRIFUGE APPARATUS
Original Filed April 12, 1966 8 Sheets-Sheet 3

INVENTOR.
Robert C. Franklin
BY William R. Boyd
Attorneys

INVENTOR.
Robert C. Franklin
BY William R. Boyd
Attorneys

INVENTOR.
Robert C. Franklin
BY William R. Boyd
Attorneys

| CELL | | FF #1 | FF #2 | FF #3 |
|---|---|---|---|---|
| 1 | — | $\bar{A}$ | $\bar{B}$ | $\bar{C}$ |
| 2 | — | A | $\bar{B}$ | $\bar{C}$ |
| 3 | — | $\bar{A}$ | B | $\bar{C}$ |
| 4 | — | A | B | $\bar{C}$ |
| 5 | — | $\bar{A}$ | $\bar{B}$ | C |
| 6 | — | A | $\bar{B}$ | C |

INVENTOR.
Robert C. Franklin
BY William R. Boyd
Flehr & Swain
Attorneys

INVENTOR.
Robert C. Franklin
BY William R. Boyd
Flehr, Hohbach, Test, Albritton & Herbert
Attorneys INVENTOR.
Robert C. Franklin
BY William R. Boyd
Fehr & Swain
Attorneys United States Patent Office 3,518,012
Patented June 30, 1970

3,518,012

CELL IDENTIFICATION AND SELECTION SYSTEM FOR CENTRIFUGE APPARATUS

Robert C. Franklin, San Jose, and William R. Boyd, Oakland, Calif., assignors to Beckman Instruments, Inc., a corporation of California Continuation of application Ser. No. 542,031, Apr. 12, 1966. This application Feb. 7, 1969, Ser. No. 800,346
Int. Cl. G01n *21/24*
U.S. Cl. 356—197 19 Claims

ABSTRACT OF THE DISCLOSURE

A system is disclosed for selectively monitoring the contents of one or more cells from among a plurality of cells carried by a centrifuge rotor. The system includes means for identifying each cell, means for selecting the cell to be monitored, and a photo responsive device to determine the transmission characteristics of the sample carried by the cells.

This application is a continuation of U.S. application S.N. 542,031 filed Apr. 12, 1966 under the name of W. R. Boyd et al., and now abandoned.

This invention relates generally to a photoelectric scanning system for ultra centrifuges, and more particularly relates to a system for selectively scanning any two of a plurality of cells of a centrifuge.

In copending application Ser. No. 452,681, assigned to the same assignee as the assignee herein, there is shown a photo-electric scanning system for comparing the optical density of a reference solution with that of a liquid sample, both liquids being carried by a double sector cell in the rotor of a centrifuge. The scanning system in the above identified application is particularly useful in scanning the first and second sectors of a double-sector cell and for making a comparison between the electrical signals derived from each of such scans.

In general, according to one aspect of the construction shown in the above identified application, the two electrical signals are derived from scanning the two sectors of a double-sector cell and the two signals are compared in a differential amplifier. A time delay circuit serves to route (and thereby separate) the two signals whereby they can be respectively fed to two inputs of a differential amplifier for comparison.

It will be appreciated that where a double-sector cell is used in a high speed centrifuge rotor, very little time elapses between that time when light is passed through the first sector of the cell and that time when light is passed through the second sector of the cell. This time delay is on the order of a few micro seconds and, accordingly, the discrimination between the two signals is accurately and readily effected by a circuit having a very short time delay, as provided in the above application.

When it is desired to employ a plurality of single sector cells in the rotor use of such time delay discrimination between successive photo signals entails certain disadvantages of adjustment and selection.

Thus, for example, where six single-sector cells are carried in a rotor, 1/6 of a rotor revolution transpires between successive scans and resultant photo signals sensed by the circuit. At low speeds, the time lapse between these two successive photo signals will, of course, be greater than when the rotor is operated at extremely high speeds. Accordingly, certain adjustments must be made to the time delay circuitry for a given rotor speed if it is desired to channel a first photo signal through one path to the differential amplifier while channelling the next successive signal to the differential amplifier via a different path. In addition, the utilization of such a time delay arrangement makes more difficult the accurate selection of one cell for use as a reference cell and one of the other cells for use as a sample cell.

According to apparatus disclosed herein, it is possible to employ a rotor carrying a plurality of, for example, six cells and to use any one of the cells as a reference cell and any one of the other cells as the sample cell to be compared to the reference. Again, certain problems could be encountered in this regard if time delay were to be utilized for purposes of selection of the two cells inasmuch as the varying speeds of the rotor could introduce errors in selection. Accordingly, as disclosed herein, discrete selection is effected by means of a logic circuit whereby during single-sector cell operation, any two of the cells may be scanned and the output signal derived from each scan compared to the other. In addition, the time delay discrimination for double-sector cell operation, as taught by the above identified application, remains compatible with such selection scheme.

In general, it is an object of the invention to provide an improved photoelectric scanning system for an ultracentrifuge.

It is another object of the invention to provide an improved photoelectric scanning system for scanning a plurality of cells carried in the rotor of an ultracentrifuge whereby the optical density of any two of the cells may be selectively compared.

It is another object of the invention to provide an improved photoelectric scanning system for an ultracentrifuge whereby both single-sector and double-sector cell operation may be accommodated.

These and other objects of the invention will be more clearly apparent from the following detailed description of the preferred embodiment of the invention, when considered in conjunction with the accompanying drawings in which:

Referring to the drawing.

Figures 5, 6, 7:
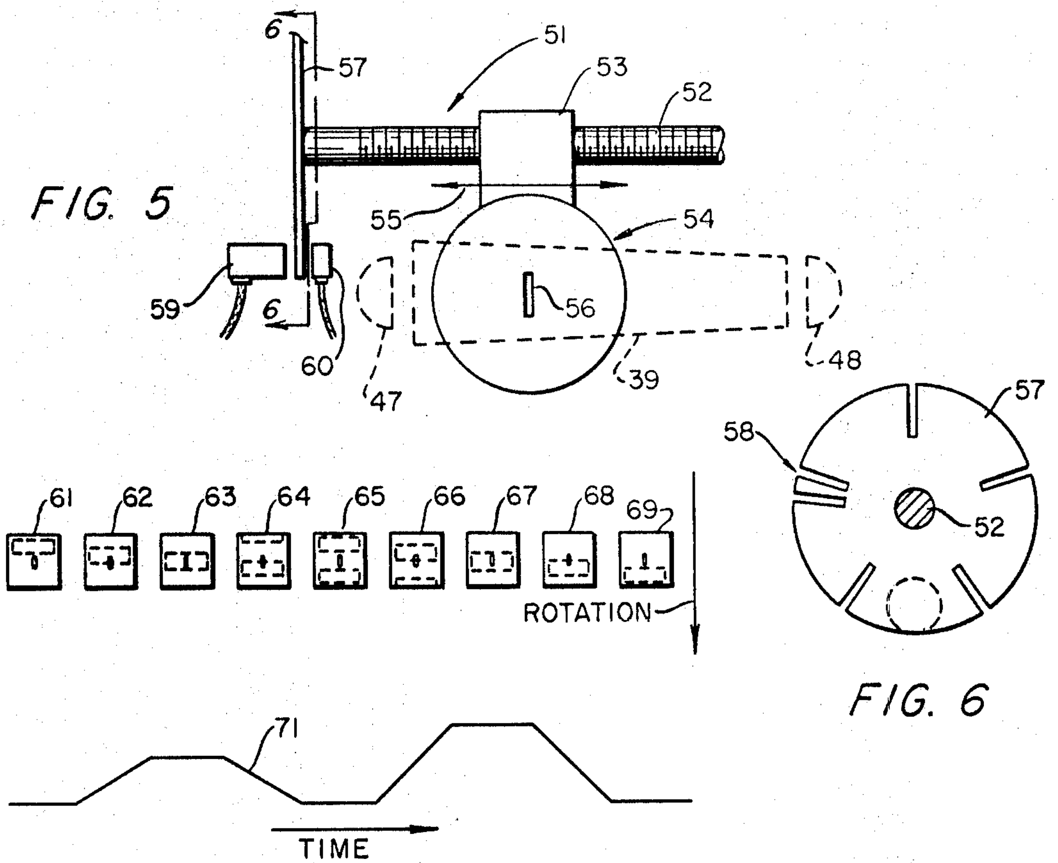
FIG. 5 is a schematic view showing a photomultiplier tube and mount for scanning the tube across the cell image and the means for generating position markers.
FIG. 6 is a view taken generally along the line 6—6 of FIG. 5 showing the position mark generating wheel.
Figure 8:
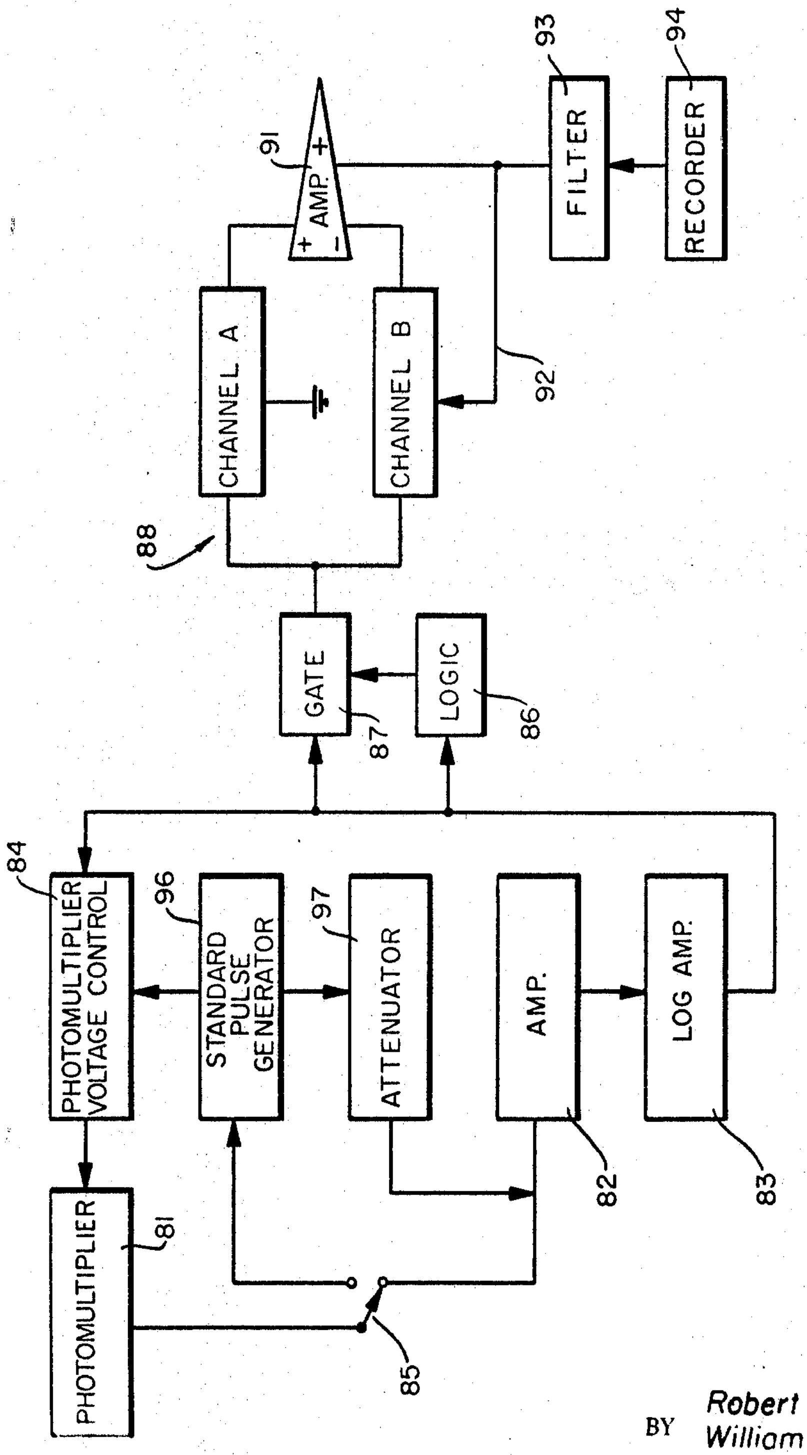
Figure 9:
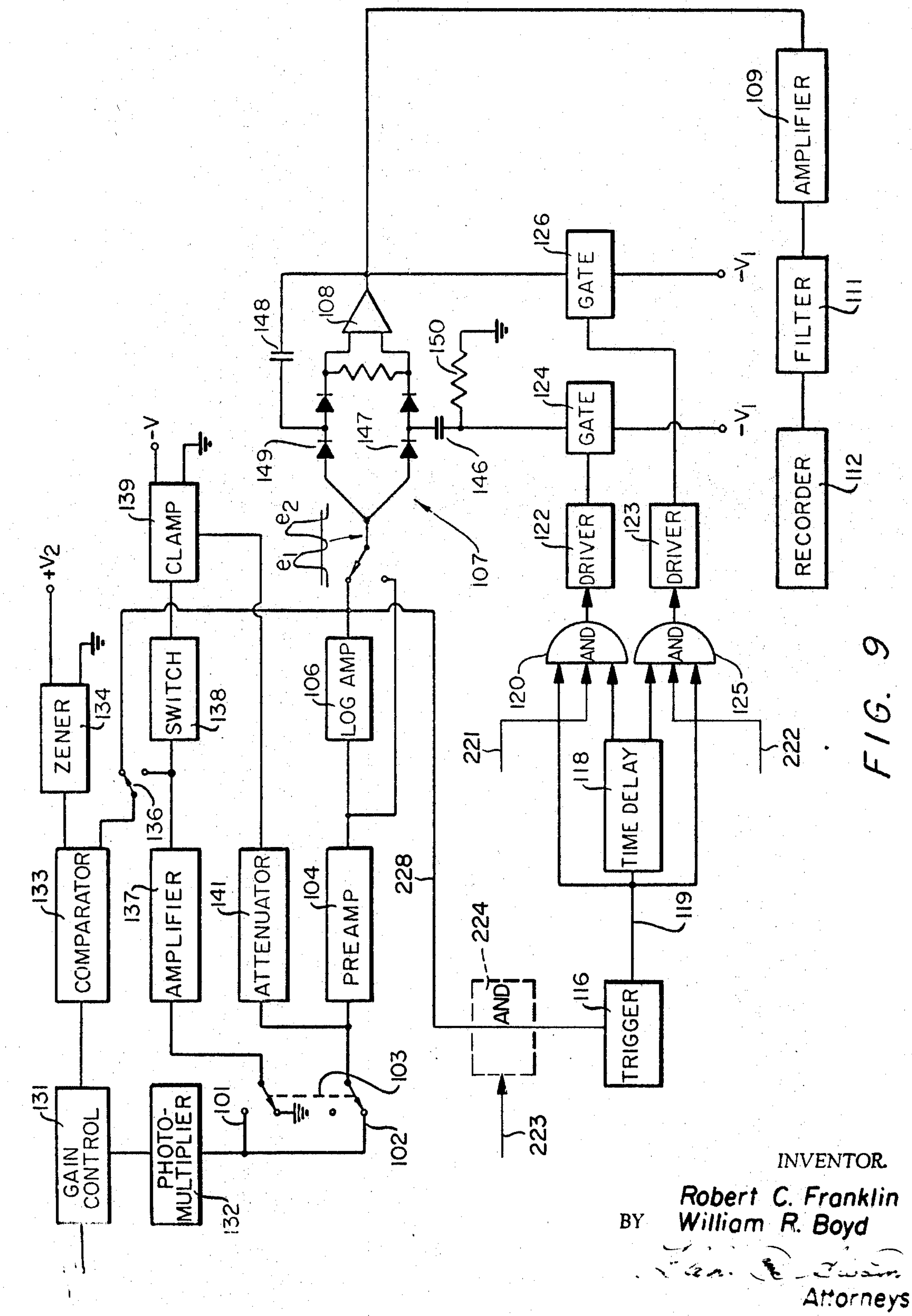
Figure 10:
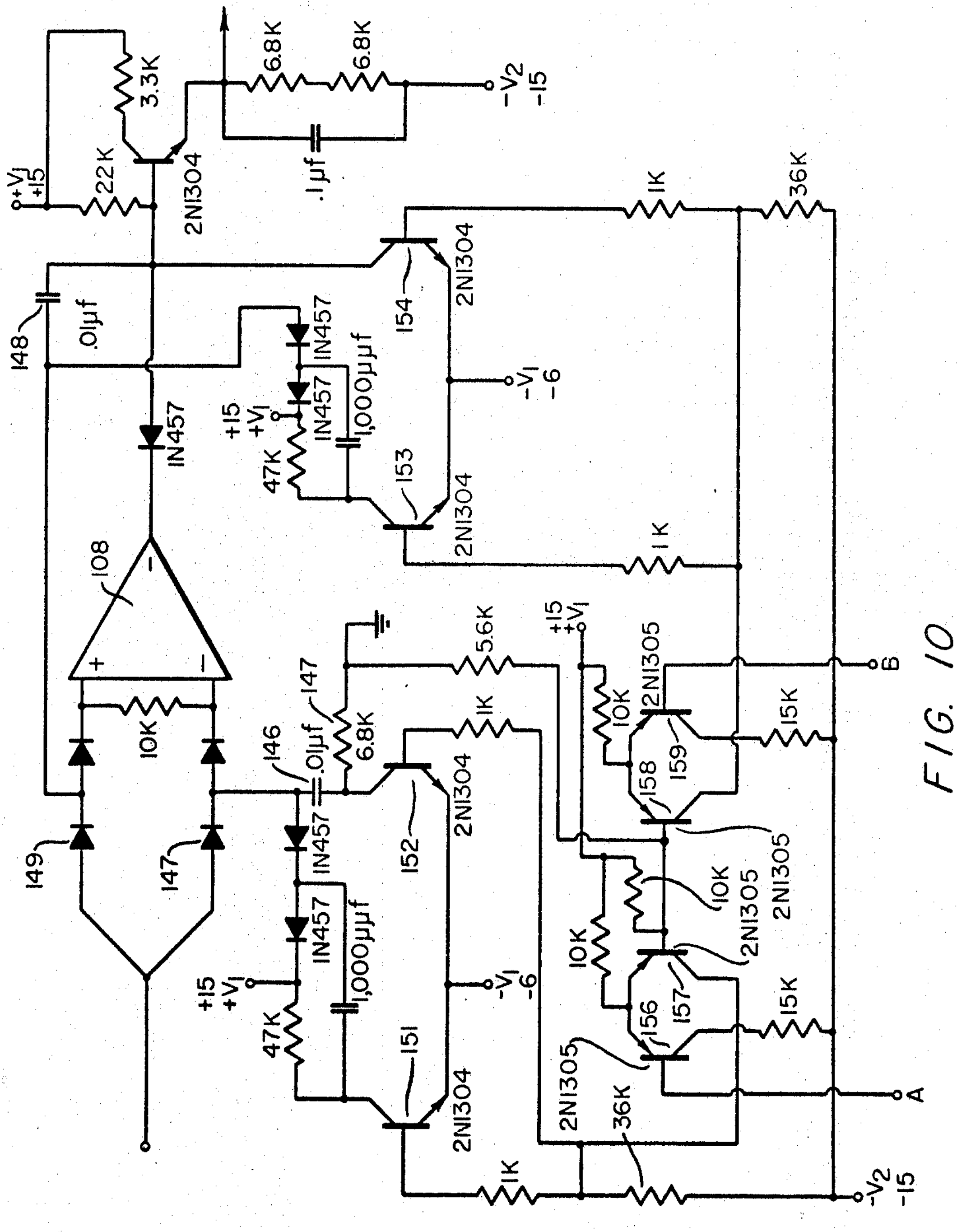
Figures 11, 12:
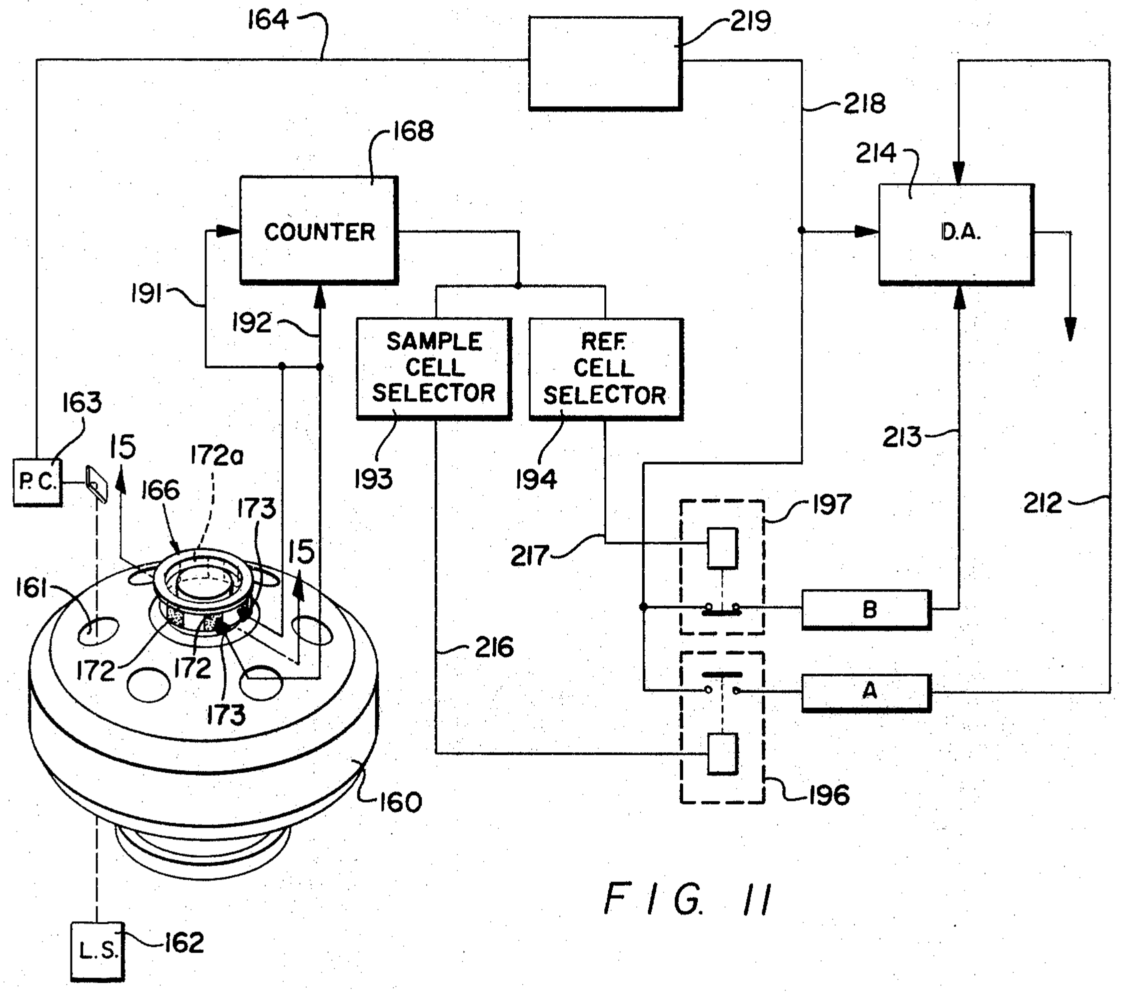
Figures 13, 14:
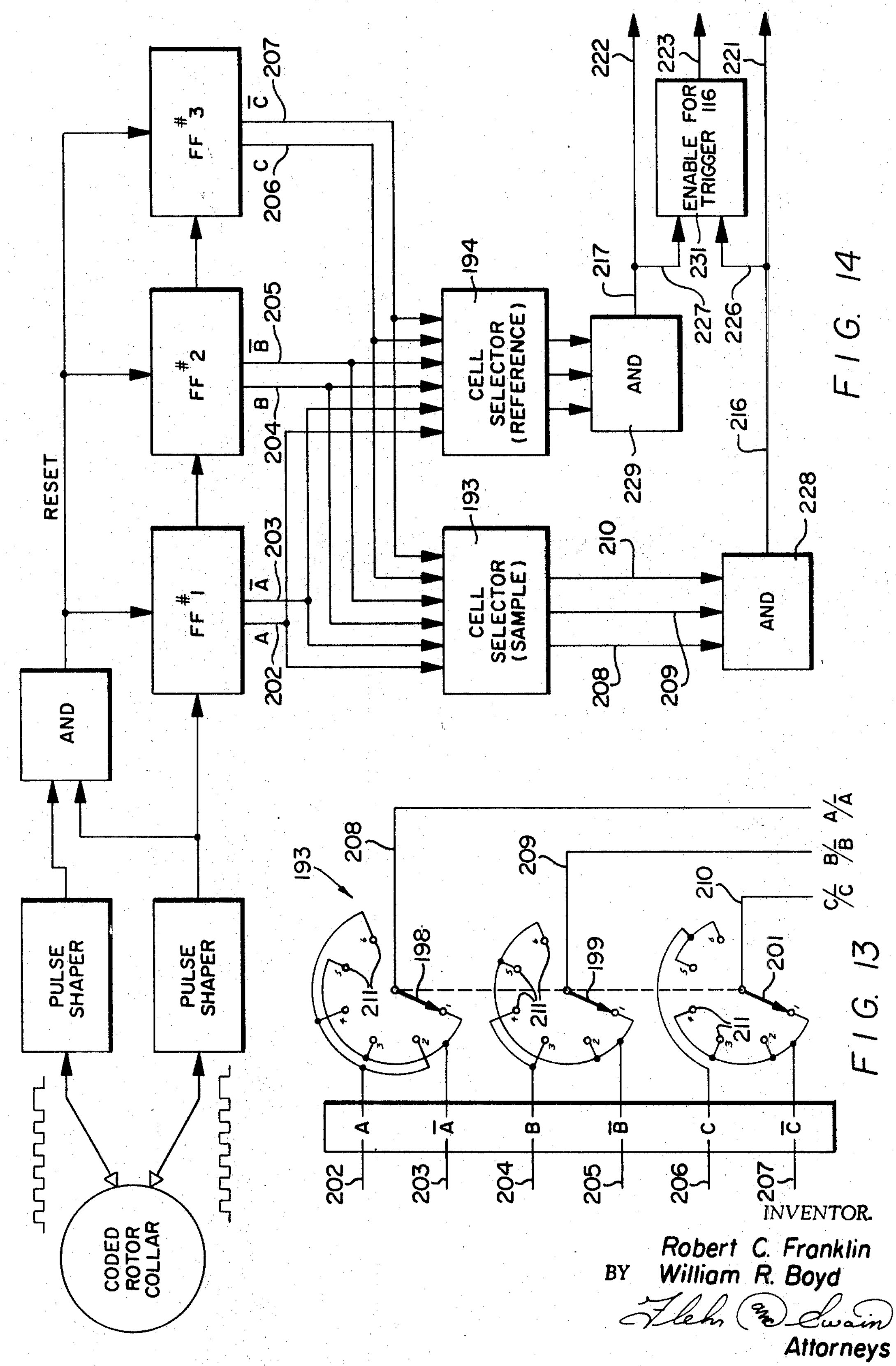
Figure 15:
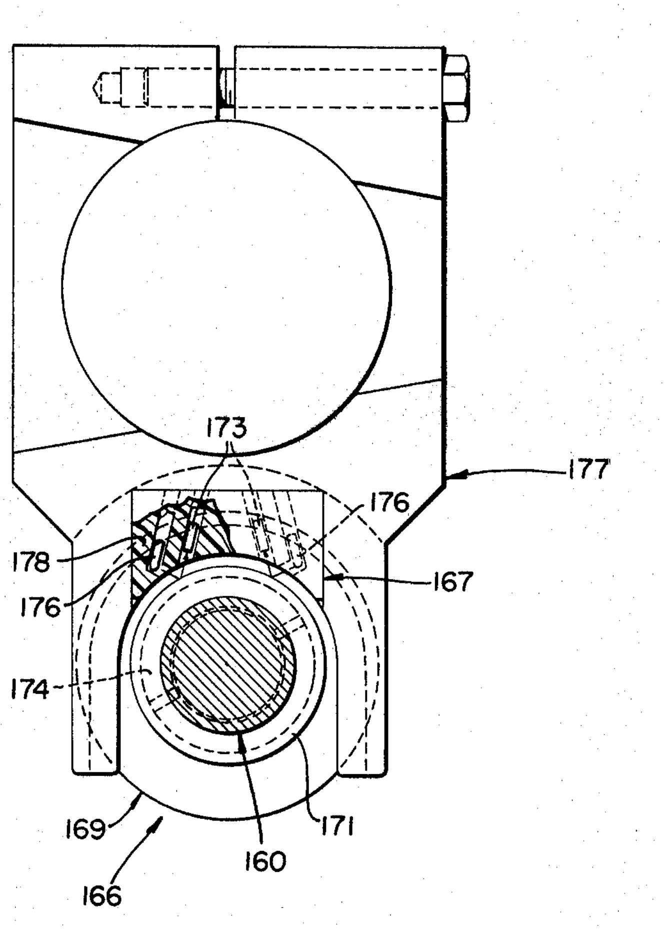

FIG. 7 schematically illustrates the pulse formation during a rotation of the centrifuge;

FIG. 8 is a simplified block diagram of the electrical circuits of a photoelectric scanning system;

FIG. 9 is a more detailed circuit diagram of the electrical circuits of the photoelectric scanning system;

FIG. 10 is a circuit diagram of the sample, hold and subtract circuit used in the photoelectric scanning system;

FIG. 11 shows diagrammatically the system for identifying and selecting cells, according to the invention;

FIG. 12 is a chart showing coded outputs of three cascaded flip-flops serving to digitally count cells of the rotor;

FIG. 13 is a schematic showing of a three deck selector switch;

FIG. 14 is a block diagram of a system for identifying and selecting cells;

FIG. 15 shows a rotor arranged with a pulse generator means.

In general, there is provided a system for scanning any selected two of a plurality of centrifuge cells. The system is particularly useful in scanning "single sector" cells. The system includes photo-responsive means for scanning the cells at a point in their cyclic path during rotation of the rotor and for providing electrical scanning signal varying in accordance with the optical density of material carried in each cell. Signal processing means such as a comparator for receiving and processing first and second signals and for providing an output derived therefrom receives the first and second signals as inputs along separate channels. Means have been provided for identifying each cell at a time next immediately preceding passage of the cell through the scanning point of the path. Thus, at a first selected count (representing one cell) one channel is enabled in order to transmit an electrical signal at that time to the signal processing means along the enabled channel. The other channel is enabled at a second selected count (representing another cell) in order to transmit its electrical scanning signal to the signal processing circuit.

The means for selectively enabling one or the other of two inputs for the signal comparing means include means for cyclically counting the cells commencing with a predetermined one of the cells. A first and a second selector of a type settable to a selected count of the counting means is operatively coupled thereto and responsive to attainment of the selected count therein so as to operate gating means, associated with the first and second channels for selectively enabling same.

Thus, it is possible to set one of the selectors at a predetermined count and to set the other selector to a different count and thereby transmit an electrical signal representative of a scan of one of the cells along one channel to the signal processing means and to transmit an electrical signal representative of a scan of a second selected cell along a second channel to the signal processing means. The signal processing means preferably includes means for comparing the two signals.

Figure 1:
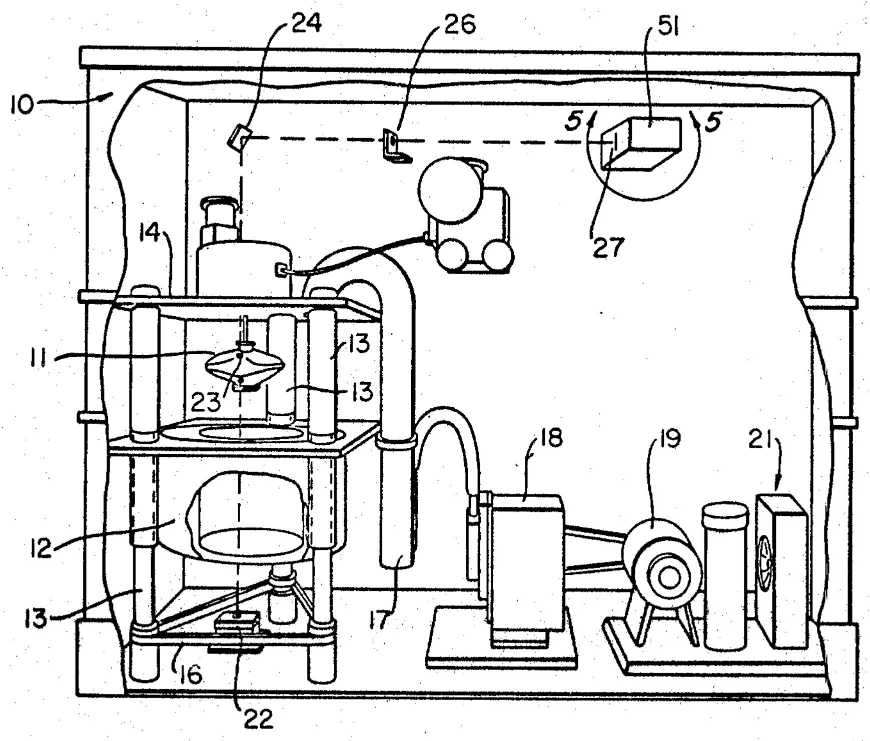
FIG. 1 is a schematic diagram of an ultracentrifuge showing the drive means, rotor, refrigerator, vacuum pump, optical system and scanning device for measuring absorption.

Referring more particularly to FIG. 1, there is shown an ultracentrifuge having a housing 10 which houses a centrifuge assembly. The centrifuge assembly includes a rotor 11 which rotates in a heavy steel chamber 12 mounted on spaced screws 13. Rotation of the screws moves the chamber upwardly into sealing engagement with a cover 14. The screws may be rotated, for example, by means of a chain 16. When the chamber is closed, it may be evacuated by a vacuum system including a diffusion pump 17 and backup pump 18 driven by a motor 19. Chamber 12 may be refrigerated by a refrigeration unit 21.

Rotor 11 includes a number of cells 23 adapted to contain fluid sample. For continuously detecting sample concentrations, light from a slit source 22 is paralleled by a collimating lens (not shown) and directed through cells 23 carried by the rotor 11. In the region of the sedimenting boundaries, the light rays suffer absorption which the system is designed to measure. The parallel light is condensed by condensing lens (not shown) which strikes a front surface deflecting mirror 24, passes through a lens 26 and forms an image on the image plane designated generally by the numeral 27.

Figure 2:
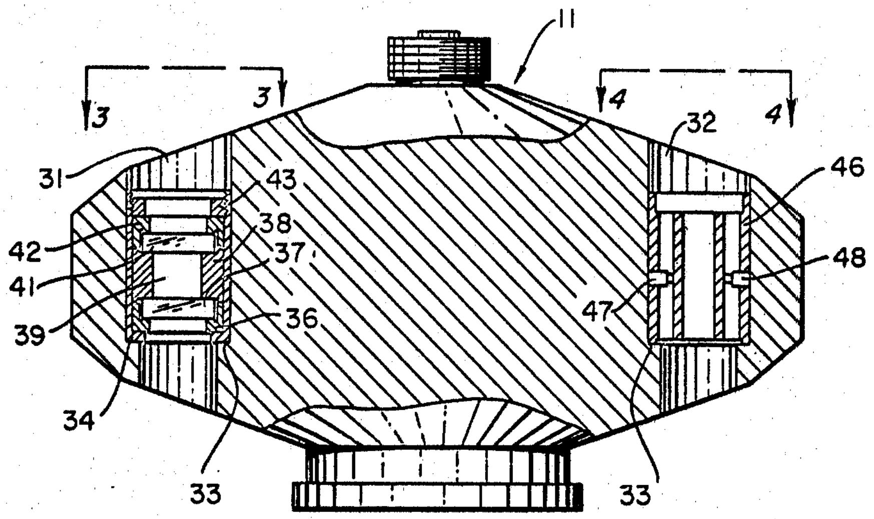
FIG. 2 is an enlarged view of a rotor suitable for use in the ultracentrifuge of FIG. 1.
Figure 3:
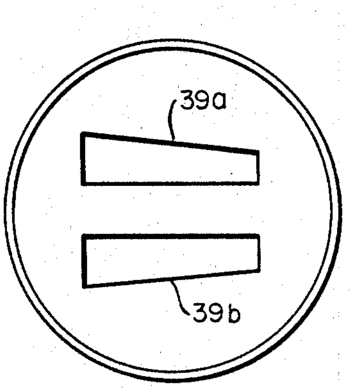
FIG. 3 is a view taken generally along the line 3—3 of FIG. 2 and showing the double sector cell.
Figure 4:
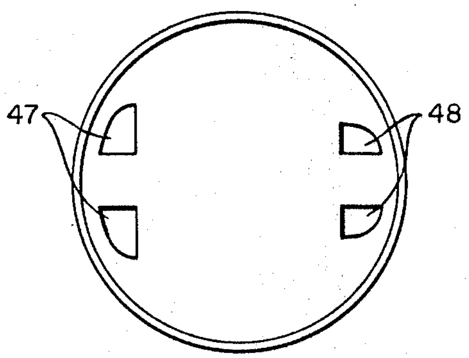
FIG. 4 is a view taken along the line 4—4 of FIG. 2 and showing the reference holes contained in the counterbalance cell.

Referring to FIG. 2, there is shown an enlarged view of rotor 11. The rotor shown includes cell openings 31 and 32 disposed diametrically opposite each other. Each of the openings comprises a hole formed through the rotor and having a lower shoulder 33. The sample cell includes an insert 34 adapted to receive a lower sealing ring 36, a window 37, a spacer 38 provided with one or more channels 39 for receiving sample, and for purposes of the present explanation it will be assumed that only a single channel 39 has been provided in each cell 23. An upper window 41, upper sealing ring 42, and a threaded ring 43 for holding the assembly together complete the cell construction.

The sample to be analyzed is contained in one of cells 23 within the chamber defined by channel 39, and a reference solution is contained within another of cells 23. Where a number of cells 23, such as six cells 23, we use five samples and a reference solution can be carried by the rotor, and several examinations can be conducted under virtually identical conditions merely by switching selection means described below.

A photoelectric scanning mechanism 51 (FIG. 5) is disposed at the image plane 27. The scanning mechanism may include a lead screw 52 with means (not shown) for rotating the same in either direction at a predetermined speed. The lead screw is threadably received by a follower 53 which carries a photomultiplier tube in housing 54. Housing 54 is moved back and forth as shown by the arrow 55. A slit 56 having a predetermined width and length is disposed in front of the photomultiplier tube.

Referring to FIG. 5 particularly, there is shown in dotted outline the image of the reference holes 47 and 48 and the image of one cell 39.

The end of lead screw 52 carries an apertured disc 57, shown in more detail in FIG. 6. A double aperture 58 is located at one location. A light source 59 is disposed on one side of the disc and a photoresponsive device 60 is disposed on the other side. Thus, as lead screw 52 rotates, a pulse is generated as each of the apertures is in the light path between light source 59 and photocell 60. These pulses serve to give the exact location of slit 56 along with the image.

Thus, a magnified composite image of the cell sectors and reference holes 47, 48 is projected through the optical system to a plane at photomultiplier slit 56. Photomultiplier and slit 56 are mounted on a common carriage so that they can scan across the entire image. Slit 56 is disposed perpendicular to the direction of travel. As slit 56 scans the image, the photomultiplier continuously detects variations in the amount of light transmitted by the contents of the cell. In the case of a double sector cell, both sectors are scanned almost simultaneously by the same optical system. This means that the contents of the two sectors are observed under virtually identical conditions of light intensity, wave lengths, centrifugal forces, optics, etc. The detected light levels are transformed by the electronic circuits, to be presently described, into current pulses which may be proportional to the logarithm of the light levels. These current pulses which hold the desired information are compared with one another and their difference traced out on a curve on a recorded chart. This curve is a function curve. A separate circuit may be provided for determining the time derivative and tracing out a second curve which may be called the derivative curve. A marker pen along the edge of the paper can be synchronized with the multiplier carriage by taking the electrical output of photocell 60 and providing marks or pips along the side margin of the paper to give a record of the position of the slit.

As will be presently described, built-in calibration circuits provide separate calibration patterns for each scan. The calibration pattern is inserted in the electronic circuits at the same point as is the absorption information from the photomultiplier tube so that it undergoes exactly the same processing as the absorption information and is traced out by the same pen only seconds ahead of the function curve. Thus, any variation in gain or other electronic characteristic which would affect the information also affects the calibration pattern by the same amount and are nullified.

Image 39, as shown in FIG. 5, appears to be that of only one sector and of one pair of reference holes. Actually, when using a double-sector cell, the image is a composite image of the two sectors separated in time only by a few microseconds and the double reference holes are disposed 180° around the rotor. The time spacing between the sector images will depend on rotor speed. For example, at 60,000 r.p.m. it will take the rotor 5 or 6 microseconds to rotate the 2° between the cell sectors.

The photomultiplier tube is a combined light detector and electronic amplifier. The tube receives short bursts of light produced by the sectors crossing the light beam, and converts these light pulses into current pulses that can be electronically compared. Operation of photomultiplier tubes is well known and will not be described in further detail.

The very narrow slit 56 allows only a small area of the image to be projected onto the photomultiplier tube at any one time. The area during any one rotation of the rotor is referred to as one sample of the image. Depending on rotor speed and scan rate, there may be formed several hundred to several hundred thousand of these samples in the time it takes the slit to scan across the image.

Discrimination between the successive pulses derived by scanning the two sectors of a double sector cell proceeds as now to be described. Referring to FIG. 7, there is schematically shown pulses generated by the photomultiplier tube when a double-sector cell is employed. The upper portion of the slit and sector images for different periods of time as the image of the double-sector cell moves past the slit. The lower curve 71 shows the current output from the photomultiplier tube. Slide 61 shows the image of the cell sector and the slit just as the image is approaching the slit; there is no current output. Slide 62 shows the beginning of a pulse as the edge of the cell image strikes slit 56. Slide 63 shows slit 56 completely covered by the cell image and maximum current output. Slide 64 shows the cell image leaving the slit and the current decreasing. Slide 65 shows the slit between the sectors and no current output. Slides 66, 67, 68 and 69 show a similar sequence for the second sector. As shown in FIG. 7, the first pulse is the pulse containing the solution wherein there is more absorption of light than in the second sector which contains the solvent or reference solution. The approximate time between the beginning of the first pulse and the beginning of the second pulse at 60,000 r.p.m. is approximately 14 microseconds.

The following is a general description of the electronic circuits for processing the photomultiplier output shown generally in block diagram of FIG. 8. The pulses developed by the photomultiplier circuits 81 are amplified by an amplifier 82 and applied to a log amplifier 83. The output of the log amplifier is the logarithm of the input, making it possible to eventually measure the output directly in units of optical density rather than in percent transmission. The log amplifier output is fed to the high voltage control circuits 84 and to the logic and gate circuits 86 and 87, respectively. The output of the log amplifier is gated and applied to a sample and hold circuit designated generally by the reference numeral 88.

To recognize and separate the two pulses generated by the photomultiplier tube, high speed switching circuits 86, 87 are employed. The switching action is synchronized with the speed of the rotor so that the pulses are gated to different channels for processing. Since the rotor speed is arbitrary, the width of the pulses and the space between them will vary a great deal—even during a single run. For this reason, the switching action is not set to any predetermined timing but is synchronous, that is, triggered by the first burst of light in each revolution of the rotor and reset after the light disappears. Timing accuracy is thus made completely independent of rotor speed and the circuits will work equally well if the light pulses are from the reference holes, the reference cell or the sample cell.

The sample, hold and subtract 88 samples the size of the first pulse, then remembers it by storing it in a holding circuit while it samples the second pulse. After the second pulse is sampled, the rotor will have blocked all light to the scanner for the remainder of that revolution so that there is ample time to compare the two pulses. During this "dark" time, the switching circuit resets itself and waits for the next pulse.

The primary purpose of the sampling and holding circuits is to bring the two pulse amplitudes together in time so that they can be subtracted one from the other and to produce a continuous output of updated information.

To indicate the height difference between the two sampled and stored pulses, each pulse is connected to one of the two inputs of a balanced differential amplifier 91. The output signal from the differential amplifier is "floating," that is, free to swing instantly either positive or negative relative to the output level established by the previous pair of pulses measured. The output signal is only at equilibrium when the voltage level at the two inputs is identical. If one pulse is higher than the other, the voltage levels at the inputs will be unequal and the output signal will swing either positive or negative depending on which pulse is higher.

The differential amplifier circuit contains a feedback network designated by the line 92 which immediately rebalances the input voltages if they are unequal. When the unbalanced input causes the output signal to change, this change in voltage is fed back to the channel *b* input where it either adds or subtracts just enough voltage to make the two input voltages identical. The output voltage must, therefore, always be equal to the voltage difference between the two pulses and it is this output voltage that indicates the differences between the two pulses. Since the differential amplifier is reacting very swiftly to a train of discrete high speed pulses, the information emerges as a varying signal composed of tiny steps each representing one "sample" of the cell image. The step pattern is filtered by a filter 93 into a smooth signal. The signal is then applied to a recorder 94 which traces the function curve.

The filtering is such that "unwanted" noise on the output signal to the recorder is removed. This noise signal is characteristically both of high frequency and low level. To suppress this but not unduly affect the larger high frequency information that is part of the signal, an adjustable non-linear filter is used. The amount of filtering may be varied to suit the circumstances.

The photomultiplier voltage control 84 serves to receive the output signals and to assure that the current from the photomultiplier tube remains substantially constant for the solvent sector by sampling the output voltage from the long amplifier and altering the voltage to the photomultiplier to maintain it at a constant level.

To calibrate the electronic system, the switch 85 is switched to its upper position whereby the output of the photomultiplier is applied to a standard pulse generator 96 which generates a pulse of standard height. The standard pulse is applied to a stepped attenuator 97 which provides current pulses of discrete amplitudes to amplifier 82. Since operating conditions are such that the output current of the photomultiplier is directly proportional to the amount of light striking it, and electrical standard may be substituted for an optical standard at this point. The series of standard size pulses are, in effect, electrical analogs of ten 0.2 O.D. filters placed successively in the light path making a total of 2.0 O.D. The pulses appear on a chart as a series of ten steps which mark off ten divisions between zero and 2 O.D. When the scanner is in the 1 O.D. range, only the last five steps are traced.

The output density of any point on the function curve is determined by simply following a rule line on the chart to a parallel point on the adjacent stairstep pattern. A new calibration is drawn just before each scan so that the positions on the chart will be identical for both the calibration pattern and the basic curve. The calibration steps can be independently shifted with respect to the function curve. A plot of zero O.D. can be generated from the double reference holes and gives information to position the calibration steps to give an absolute rather than a relative calibration.

FIG. 9 shows a more detailed circuit diagram of the photoelectric scanning system. The photomultiplier output is applied to the terminals 101 and 102 of switch 103. In the switch position shown, the preamplifier 104 is connected to receive the output of the photomultiplier tube. The output of the preamplifier is applied to log amplifier 106. The output of log amplifier 106 is applied to the sample, hold and subtract circuits 107. Circuits 107 include differential amplifier 108, the output of which is applied to an amplifier 109. The output of amplifier 109 is filtered at 111 and applied to a suitable recorder 112.

In order to keep track of which pulse is which, assuming a double-sector cell operation, a pulse representing a scan of the first of two sectors is channeled along a first path to the signal comparing means while another pulse representing a scan of the second of two sectors is channeled along a second path to the other input of the signal comparator, as formed by circuits 107. One input comprises the channel via condenser 146 and another input comprises the channel via condenser 148.

The presence of the first of the pulses is conveniently detected by looking at the output of log amplifier 106 with a bistable circuit, dependent only on the level of the incoming signal. Such a circuit is preferably a Schmitt trigger 116. The hysteresis of the Schmitt trigger avoids instabilities in the presence of noisy or marginally sized incoming signals. The smallest signal to be observed must be greater than an upper trigger level and the dip between signals must fall below a lower level to trigger in the other direction. Alternative means of producing gating pulses as cells come around would involve accurate timing delays and either level sensors or rotor position sensors. As previously described, an advantage of this scheme is found in elimination of rotor position sensors and of front panel controls which need to be adjusted with r.p.m.

Means are provided whereby the first pulse detected by Schmitt trigger 116 is fed to circuits 107 via a first channel and the next pulse detected is fed via a second channel. Time delay means rendered active by the first pulse serves to enable one channel while disabling the other for a predetermined period.

Thus, following Schmitt trigger 116, there is a time delay circuit 118. Delay circuit 118 is started by the trailing edge of the Schmitt pulse applied along line 119. Succeeding Schmitt pulses have no effect upon circuit 118 until it times out. The next pulse then starts circuit 118. Suitable signals are taken from the time delay circuit and fed to diode transistor logic AND circuits 120, 125. The first output from trigger circuit 116 starts time delay circuit 118. It is also applied to AND circuit 120 which passes the signal to the driver 122. The next pulse is blocked by AND circuit 120 because of the output of time delay 118 but this pulse is passed by AND circuit 125 due to the input from time delay circuit 118.

Thus, a pulse which finds the time delay dormant will be gated by AND circuit 120 to pass along a first channel to circuits 107, whereas with the time delay active, a pulse is gated by AND circuit 125 to pass along a second channel. The output of AND circuits 120, 125 is applied to drivers 122 and 123, respectively, which drive gates or switches 124 and 126 to control the routing of each scan signal to the sample, hold and subtract circuits 107.

The photomultiplier is provided with a gain control 131 which controls the high voltage $-V_2$ applied to the photomultiplier tube 132. The gain control is controlled by a comparator 133 which serves to receive a reference signal from a Zener diode 134 connected to a voltage source $+V_2$ and to receive the output from the output from the log amplifier. The comparator serves to compare these signals and vary the gain control until these two signals have a predetermined relationship.

During the calibration cycle, the switches 103 and 136 are switched to their other positions. The output pulses from photomultiplier 132 are amplified by amplifier 137 and applied to comparator 133 which serves to control the voltage gain. The amplified signal is also applied to switch 138 which drives a clamp 139. The clamp clamps the input to the attenuator 141 to a predetermined voltage indicated as $-V$. This voltage $-V$ is then applied to the attenuator 141. Attenuator 141 is stepped, as previously described, and its output applied to preamplifier 104.

A more detailed explanation of the circuits 107 is now presented. The sample, hold and subtract circuits 107, include an amplifier 108 having a differential input, very high common mode rejection, high gain and high impedance to ground from either input. Such an amplifier may, for example, be an amplifier known as Philbrick Model P–2.

As previously described, the Schmitt trigger 116 and associated logic circuits serve to close or enable gates or switches 124 and 126 to direct the pulses and operate the sample and hold circuit 107. When the first gate 124 is energized at the time of the first signal pulse, the gate closes and the voltage across capacitor 146 approaches a voltage $E_1$ which is the sum of the voltage $-V_1$ and $e_1$, ignoring the drops across the charging diode 147. When the gate 124 is open (between incoming pulses), the end of capacitor 146 connected to gate 124 is at ground, since no current can flow through the charging diode 147 in the reverse direction and the impedance seen through the other diode connected to capacitor 146 is very high. Therefore, no current flows through the resistor 150 and the bottom end of capacitor 146 remains at ground. The top of capacitor 146 is at a voltage $E_1$ equal to the sum of $+V_1+e_1$ positive with respect to ground.

When the next pulse is sensed, gate 126 is closed and the amplifier output voltage is forced to the voltage $-V_1$. The capacitor 148 charges to a voltage $E_2$ which is the sum of $+V_1$ and $e_2$. When gate 126 opens, the output of the amplifier rises to a level which produces zero difference between the voltages at the inputs. In actuality, this may amount to a millivolt or so. Capacitor 148 has no discharge path, since it sees only the back biased diode 149 and the input impedance of the amplifier. Since the voltage at the input terminals to the amplifier are virtually equal, the output voltage is $$\begin{aligned} E_1-E_2 &= (V_1+e-(+V_1+e_2) \\ &= V_1+e_1-V_1-e_2 \\ &= e_1-e_2 \end{aligned}$$

It is noted that the voltage $+V_1$ drops out so long as it is constant during both sampling times. The important consideration is that $-V_1+e_1$ for $e_1$ minimum be greater than any $e_2$ which will be produced. This ensures that the charging diodes will remain back biased until the proper gate closes the switch. Hence, the information is sampled and held until the next set of gates come along. In actuality, discharge paths are provided which are in the order of 20 megohms to give stability. Provision is made to equalize the discharge rates so that the amplifier output does not change between samples.

Referring more specifically to FIG. 10, a detailed circuit diagram of the sample, hold and subtract circuits schematically illustrated in FIG. 9 is shown. The transistors 151 and 152 and associated circuitry form the gate 124, while the transistors 153 and 154 form gate 126. Transistors 151, 153 and associated circuitry serve to discharge the holding capacitors 146 and 148, respectively, so that rapidly decreasing input pulses $e_1$ and $e_2$ can be accurately followed. The transistors 156 and 157 and associated circuitry form driver 122, while the transistors 158 and 159 form driver 123. The values of the resistors, capacitors and type of transistors and diodes for a circuit constructed in accordance with the invention are given. A system including a circuit such as shown was constructed and gave readings of optical density of a sample from zero to 2 O.D. with rotor speeds varying between 1000 r.p.m. and 60,000 r.p.m.

Thus, there is provideod a photoelectric scanning system for centrifuges capable of providing electrical signals corresponding to concentration of material in an ultracentrifuge cell during centrifugation. The system is easily calibrated. The electrical signals are useful, for example, to drive a recorder for providing a record of the concentration distribution.

The foregoing system arrangement serves to provide scanning of a double sector cell whereby the first pulse derived from scanning the cell is fed through the first channel to provide a first input to a signal comparing means. The next subsequent pulse signal, representing the second sector in the same cell, is fed to a second channel to provide another input to the comparing means. Time delay circuit 118 is responsive to the first of successive application of pulses derived from scanning the first and second cell sectors whereby one channel to the comparing means is enabled while the other channel is blocked and thus vice versa upon receiving the second pulse signal. The time delay circuit is thus responsive to the trailing edge of the first pulse received to block for a limited time, the first channel and to enable the second channel so that the next pulse is fed along the latter.

In many instances it is desirable to employ a centrifuge rotor including four, six or more sample cells for purposes of running a number of different comparisons between a reference cell and the several samples whereby each comparison can be made under substantially identical conditions. Accordingly, as now to be described, the foregoing scanning system arrangement has been utilized in conjunction with selection and control circuitry whereby the optical density of liquid in any two of the cells may be compared.

The general system arrangement (FIG. 11) comprises a centrifuge rotor 160 including six cells, 161. A light source 162 directs a beam of light into the path of rotation of cells 161 at a predetermined point in the travel thereof whereby, as described fully above, photo signals representative of the optical density of each cell may be generated by a photocell or other photoresponsive means 163 to provide photo signals along line 164.

To identify each cell at a time next immediately preceding passage of the cell through the scanning point includes means of cyclically counting the cells, commencing with a predetermined one of the cells. The last named means includes markers on the cap assembly 166 related to each cell, a photo cell assembly 167 for sensing the markers and a counter circuit 168 responsive to assembly 167 to cyclically count the markers. The markers are arranged whereby one is elongated to be conjointly sensed by two photo elements of assembly 167 to define a predetermined point in the cyclic rotation of rotor 160 so as to reset counter 168.

Cap assembly 166 is adapted to be secured to the upper end of rotor 160 and includes a cap member 169 formed with a sleeve portion 171. For a six cell rotor, sleeve portion 171 includes six markers defined by regions 172 of contrasting color to provide alternate light and dark surface areas arranged to be sensed by photo cells 173 carried within photo cell assembly 167, as will be described in more detail below. As noted, one of regions 172 (referred to as **172*a*) is of greater circumferential extent as compared to the others whereby the elongated area will be conjointly sensed by each of a pair of photo cells 173 of assembly 167. Ring 174 retains cap member 169 to the upper end of rotor 160**.

Photo cell assembly 167 further includes a pair of incandescent lamps 176 provided in a housing 177 and disposed and adapted to shine upon a respective one of the photocells 173 by reflection from the light colored areas on sleeve portion 171.

Means for supporting photocells 173 in close spaced relation to the rotating marker regions 172, **172*a* of cap member 169 includes the forked member 177 adapted to be clamped at a suitable height. Member 177 carries a photocell housing 178 formed whereby each photocell 173 looks at marker regions 172, 172*a* via openings formed in housing 178. Similarly, openings are formed to project light onto regions, 172, 172*a* from lamps 176**.

In general, the operation of the apparatus to this point proceeds with a projection of light from light source 162 through each of cells 161 so as to generate photo signals representative of the optical density of each cell. Cap member 169 rotates with rotor 160 to successively present to each of photo cells 173 alternate areas of light and dark and once during each revolution both photocells 173 will have a period when they are both sensing the darkened elongated marker **172*a* and it is this predetermined point in the cycle that identifies the No. 1 cell position. Cap assembly 167 is, of course, oriented with respect to a given one of cells 161 whereby it will be "counted" at a time immediately preceding passage of that cell through the scanning point defined by the light beam from light source 162**.

Counter circuit 168 therefore receives impulses successively from each of the marker areas 172, **172*a* via one of photo cells 173. This is represented by the train of pulses proceeding along line 191. The other photo cell is circumferentially disposed a sufficient distance from the first photo cell whereby only during the passage of the elongated marker region 172*a* will both photocells 173** be conjointly sensing a dark region.

Accordingly, the pulses developed by the second photocell are out of phase with the pulses of the first photocell and overlap in time only during the period when the dark region **172*a* is sensed and thus a reset line 192 is adapted to receive pulses conjointly from both photocells. Counter circuit 168 is responsive via line 192 to the conjoint receipt of a signal representing the sensing of the darkened region 172*a***.

Counter circuit 168 provides an output which effectively counts from one to six. Briefly stated and as further described below the output of counter 168 appears as the combination of three bi-stable conditions indicating the condition of three bi-stable binary counters cascaded one to the next. For example, as shown in the chart in FIG. 12, digital counting from one to six is shown as the various combinations of binary outputs where, for example, the output of a first flip-flop circuit is shown as either A or $\overline{A}$ representing either a first or second condition of that particular flip-flop.

A first and second selector means 193, 194 are operatively coupled to counter 168. Each selector 193, 194 is of a type settable to a selected count of counter 168 and operatively responsive to attainment of a selected count therein to operate an associated gating means 196, 197 shown schematically in the diagram of FIG. 13 merely as a pair of solenoid actuated relays each controlling a switch.

Each selector means 193, 194 may, for example, be of a type shown in FIG. 13 comprising a three-deck switch positionable to any one of six positions whereby three switch armatures 198, 199, and 201 are positionable as a unit and serve to respectively couple input leads 202 or 203, 204 or 205, and 206 or 207 to deliver signals respectively to three output leads 208, 209 or 210. With switch, for example, 193 in position to select cell #1, the switch armature 198 and the others will be disposed in contact with the first of the six contacts 211. Thus, a signal will be transmitted via the first deck of switch 193 only when it appears on lead 203 thereby representing the condition $\overline{A}$. At that time, the signal will be transmitted via switch armature 198 and onto output lead 208. A signal on input lead 205 representing the condition $\overline{B}$ will likewise be fed via switch armature 199 to provide an output on lead 209 and a signal on above. The output condition appearing on lines 208, 209 and 210 will be the condition $\overline{A}$, $\overline{B}$, $\overline{C}$, which is identified in the chart in FIG. 12 as representing cell #1. Selector switch 194 is similarly arranged.

As mentioned above one of the selector switches 193, 194 may be arranged to "enable" one of the input channels 212, 213, to the differential amplifier 214 and the other one of selector switches 193, 194 arranged to "enable" the other of the two input channels 212, 213. The schematic representation shown in FIG. 11 shows merely an output line 216, 217 respectively emanating from selector switches 193, 194 and leading to a solenoid operated switch 196, 197 respectively disposed to enable or disable the input to channels 212, 213.

Channels 212, 213 conjointly receive the photo signals derived by the photoelectric scanning system explained in detail earlier above. These photoelectric scanning signals are supplied to channels 212, 213 via line 218 and the box 219 is supplied in the diagrammatic representation of FIG. 11 as representative of the electronic scanning system earlier described.

A detailed explanation of the logic system of the selection scheme and its cooperation with the scanning system is provided further below. However, the general operations of the apparatus may be explained as follows with reference to FIG. 11.

Assuming, the example, cell #2 is to be compared with cell #5 and that the former cell carries a sample to be examined while the latter carries a reference fluid, such as water, sample cell selector switch 193 will be set to the #2 position and reference cell selector switch 194 will be set to the #5 position. Assuming the high speed rotation of rotor 160 and the operation of light source 162 to provide a projected light beam into the path of cells 161, photocell 163, provides a varying electrical signal to the scanning system 219. The output of scanning system 219 is fed via line 218 to the differential amplifier means 214 which may, for example, be comprised of the circuits 107 of FIG. 9.

From the foregoing, it is readily apparent that photocell 163 provides a varying electrical signal on line 164 for each and every cell. The object of the selection apparatus is to seek out and present the scanning signals derived from two selected cells. In the example herein the selected cell signals are those derived from cells #2 and #5. Accordingly, counter circuit 168 supplies a coded output cyclically counting digitally from 1 to 6.

Counter circuit 168 serves to condition six leads 202 through 207 connected to each of the two selector switches 193, 194. Selector switch 193, having been set to the #2 position will provide a suitable output on output leads 208, 209 and 210 when counter circuit 168 has counted digitally to the numeral two. At that time, an output will appear on lead 216 for "enabling" channel 212 for the further transmission to differential amplifier 214 of electrical signals then appearing on line 218. Thus, the signals derived from scanning cell #2 are fed to the comparing means.

Selector switch 194 having been set to the #5 position will provide a similar control output on lead 217 in similar fashion at cell "#5 time." Each of selector switches 193, 194 serves to provide three output signals and these three output signals are fed to AND gates having three inputs thereto and developing an output therefrom in response to a given condition of the three inputs.

It will be recalled that time delay circuit 118 serves in conjunction with the output of trigger 116 to control the gating of pulses via a channel defined by AND gate 120, driver 122, and gate 124 on the one hand and also controls the channel defined by AND gate 125, driver 123 and gate 126. Control of these two channels under the action of time delay circuit 118 is primarily useful in conducting double sector cell analyses.

When the scanning circuit is under the further control of the identification, selection and control circuit whereby any two of a plurality of cells may be selected for comparison, additional inputs to gates 120, 125 and to trigger 116 are provided along leads 221, 222, and 223 respectively. Input 223 serves to provide the second input of a two input AND gate 224 which is utilized when operating the scanning system in conjunction with the selection system.

Lead 223 receives a pulse at all selected times whereby scanning signals supplied to AND gate 224 via line 228 (FIG. 9) serve to operate trigger 116.

Thus, each cell selector 193, 194, as explained with respect to FIG. 13, provides three outputs when the selected number is received by the cell selector. The outputs appearing on leads 208, 209, 210 as previously described are fed to AND gates 228, 229 respectively for switch 193, 194. The output of each AND gate 228, 229 appears respectively on leads 221, 222, to provide the third input control to AND gates 120, 125 (FIG. 9).

Every output appearing on leads 216, 217 from AND gates 228, 229 accordingly represents identification of a selected "cell time" and at these times these output signals are also fed to the lead 223 via an OR gate 231 having inputs supplied via lines 226, 227 respectively coupled to the output of each selector switch 193, 194.

From the foregoing it will be readily apparent that in operation, the system provides control pulses on leads 221, 222 and 223 whereby the photo signal derived from scanning a selected one of several cells will be gated via one channel to a comparator or other signal processing means and the photo signals derived from scanning another of the plurality of cells are gated to be fed via a second channel to the comparator.

We claim:

1. A system for selectively monitoring the contents of one or more cells from among a plurality of cells carried by a centrifuge rotor comprising:

a continuously radiating source of light disposed on one side of said rotor for directing a beam of light through each of said cells as the centrifuge rotor travels past said light source;

a photoresponsive device disposed on the other side of said rotor for providing an electrical output signal whose amplitude varies as a function of the intensity of said light beam;

means for identifying each cell carried by the centrifuge rotor immediately prior to the time each cell rotates past said light source;

selector means operatively coupled to said identifying means for selecting at least one cell whose contents is to be monitored;

said selector means providing an output signal only when the cell identified by said identifying means is the same as the cell selected by said selector means; and electrical gating means having a first input terminal connected to said photoresponsive device, a second input terminal connected to said selector means, and an output terminal;

said gating means being closed to cause the electrical output signal from said photoresponsive device to appear at said output terminal only upon the occurrence of an output signal from said selector means.

2. A system as defined in claim 1 wherein said selector means includes:

a first selector switch for selecting a first cell and a second selector switch for selecting a second cell.

3. A system as defined in claim 2 wherein said electrical gating means comprises:

first and second electrical gating circuit, each of said gating circuits having a first input terminal connected to said photoresponsive device and an output terminal, said first gating circuit having a second input terminal connected to said first selector switch and said second gating circuit having a second input terminal connected to said second selector switch whereby said gating circuits are closed at first and second times to pass electrical signals associated with said first and second cells, respectively.

4. A system as defined in claim 3 wherein said identifying means comprises transducer means cooperating with said rotor for providing an output pulse for each cell carried by said rotor as each cell passes by said light source, counting means connected to said transducer means for counting said output pulses to identify each cell, and means for resetting said counting means once each rotation cycle of said centrifuge rotor.

5. A system for selectively monitoring the contents of one or more cells from among a plurality of cells carried by a centrifuge rotor comprising:

a continuously radiating source of light disposed on one side of said rotor for directing a beam of light through each of said cells as the centrifuge rotor travels past said light source;

a photoresponsive device located on the other side of said rotor for providing an output signal whose amplitude varies as a function of the intensity of the light beam;

transducer means cooperating with said rotor for providing an output pulse for each cell immediately prior to the time each cell travels past said light source;

counting means for counting said output pulses to identify each cell;

selector means operably connected to said counting means for selecting at least one cell whose contents is to be monitored;

said selector means providing an output signal when the cell identified by said counting means is the same as that entered in said selecting means; and electrical gating means having a first input terminal connected to said photoresponsive device, a second input terminal connected to said selector means and an output terminal, said gating means being closed to cause the electrical signal derived from said photoresponsive device to appear at said output terminal upon the occurrence of an output signal from said selector means.

6. A system as defined in claim 5 comprising in addition recording means connected to the output terminal of said gating means.

7. A system as defined in claim 5 including in addition means for resetting said counting means once each rotational cycle of said rotor.

8. A system as defined in claim 7 wherein said selector means includes a first selector switch for selecting a first cell and a second selector switch for selecting a second cell.

9. A system as defined in claim 8 wherein said gating means comprises a first gating circuit having a first input terminal connected to said photoresponsive device and a second input terminal connected to said first selector switch, a second gating circuit having a first input terminal connected to said photoresponsive device and a second input terminal connected to said second selector switch whereby said first and second gating circuits are enabled to cause said electrical signal from said photoresponsive device to appear at said respective output terminals only upon the occurrence of an output signal from said first and second selector switches, respectively.

10. A system as defined in claim 5 wherein said photoresponsive device comprises a photoelectric scanner for scanning each cell as it rotates past said light source.

11. A system for selectively monitoring the contents of one or more cells from among a plurality of cells carried by a centrifuge rotor comprising:

a continuously radiating source of light disposed on one side of said rotor for directing a beam of light through each of said cells as the rotor rotates past said light source, a photoresponsive device disposed on the other side of said rotor for receiving said light beam and providing an output signal whose amplitude varies as a function of the intensity of the light beam;

means for identifying each cell carried by the rotor immediately prior to the time the cell rotates past said light source;

selector switch means for selecting at least one cell whose contents is to be monitored;

comparing means operatively connected to both said identifying means and said selector switch means for providing an output signal when the cell identified by said identifying means is the same as the cell entered in said selecting means;

electrical gating means having a first input terminal connected to said photoresponsive device a second input terminal connected to said comparing means and an output terminal, said gating means being closed upon receipt of an output signal from said comparing means to cause the electrical signal derived from said photoresponsive device to appear at said output terminal.

12. A system as defined in claim 11 wherein said identifying means comprises transducer means for providing an output pulse immediately prior to the time each cell travels past said light source and counting means connected to said transducer means for counting said output pulses to identify each cell.

13. A system as defined in claim 12 wherein said selector switch means comprises first and second selector switches for selecting first and second cells, respectively, and said gating means comprises first and second gating circuits each having a first input terminal connected to said photoresponsive device and an output terminal; said first gating circuit having a second input terminal connected to said first selector switch and said second gating circuit having an input terminal connected to said second selector switch.

14. A system as defined in claim 13 including means for resetting said counting means once each rotational cycle of said centrifuge rotor.

15. A system as defined in claim 11 comprising in addition recording means connected to the output terminal of said gating means.

16. A system for selectively monitoring the contents of one or more cells from among a plurality of cells equally spaced about the circumference of a centrifuge rotor comprising:

a source of radiation;

means for receiving said radiation and providing an electrical output signal;

means for identifying each cell immediately prior to the time each cell travels past said radiation source;

selector means for selecting at least one cell whose contents are to be monitored; said selector means providing an output signal when the cell identified by said identifying means is the same as the cell entered in said selecting means; and electrical gating means connected to said radiation receiving means and said selector means for passing said electrical output signal from said radiation receiving means upon the occurrence of an output signal from said selector means.

17. A system defined in claim 16 wherein said identifying means comprises transducer means for providing an output pulse for each cell immediately prior to the time each cell travels past said radiation source and counting means connected to said transducer means for counting said output pulses to identify each cell.

18. A system as defined in claim 17 wherein said selector means comprises a selector switch and comparing means operatively connected to said selector switch and said counting means.

19. In an ultra centrifuge of a type having a rotor including cells therein adapted to contain liquid, said cells being spaced angularly about said rotor and defining a cyclic path under rotation thereof, a photoelectric scanning system for sensing material in said cells and for processing signals representative of each, said system comprising signal processing means having input channel means for receiving scanning signals and providing an output derived therefrom, photoresponsive scanning means serving to scan each cell at a predetermined point in the cyclic path thereof, and serving to provide an electrical signal varying in accordance with the optical density of the material therein, means for identifying each cell at a time next immediately preceding passage of the cell through said predetermined point, means for feeding each of said varying electrical signals to said input channel means, gating means operatively associated with said input channel means for selectively enabling said channel means, selector means operatively coupled to the identifying means and the gating means, said selector means being settable to operatively respond to identification of a selected one of said cells by said identifying means to condition said gating means to enable said channel means to further transmit said electrical signal therealong to said processing means, whereby said input channel means is enabled at the identification of a selected cell to transmit said electrical signal along said input channel means.

References Cited

FOREIGN PATENTS

| | | |
|---|---|---|
| 934,201 | 9/1955 | Germany. |
| 1,145,388 | 3/1963 | Germany. |

RONALD L. WIBERT, Primary Examiner

O. B. CHEW II, Assistant Examiner

U.S. Cl. X.R.

250—218